US012154719B2

(12) United States Patent
Nakamura et al.

(10) Patent No.: US 12,154,719 B2
(45) Date of Patent: Nov. 26, 2024

(54) ELECTROCHEMICAL DEVICE NEGATIVE ELECTRODE AND ELECTROCHEMICAL DEVICE, AND METHOD FOR MANUFACTURING ELECTROCHEMICAL DEVICE NEGATIVE ELECTRODE AND METHOD FOR MANUFACTURING ELECTROCHEMICAL DEVICE

(71) Applicant: Panasonic Intellectual Property Management Co., Ltd., Osaka (JP)

(72) Inventors: Yusuke Nakamura, Osaka (JP); Hideo Sakata, Osaka (JP); Toshiaki Shimizu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 661 days.

(21) Appl. No.: 17/295,008

(22) PCT Filed: Nov. 27, 2019

(86) PCT No.: PCT/JP2019/046294
§ 371 (c)(1),
(2) Date: May 18, 2021

(87) PCT Pub. No.: WO2020/111094
PCT Pub. Date: Jun. 4, 2020

(65) Prior Publication Data
US 2022/0013764 A1   Jan. 13, 2022

(30) Foreign Application Priority Data

Nov. 30, 2018   (JP) .................................. 2018-225727

(51) Int. Cl.
*H01G 11/06*   (2013.01)
*H01G 11/32*   (2013.01)
(Continued)

(52) U.S. Cl.
CPC ............ *H01G 11/06* (2013.01); *H01G 11/32* (2013.01); *H01G 11/48* (2013.01); *H01G 11/50* (2013.01);
(Continued)

(58) Field of Classification Search
None
See application file for complete search history.

(56) References Cited

U.S. PATENT DOCUMENTS

2011/0049419 A1*   3/2011   Lee ....................... H01M 4/136
                                                         252/182.1
2013/0163147 A1    6/2013   Jehara et al.
(Continued)

FOREIGN PATENT DOCUMENTS

CN      108493434 A      9/2018
JP      2014-123641      7/2014
(Continued)

OTHER PUBLICATIONS

International Search Report of PCT application No. PCT/JP2019/046294 dated Feb. 18, 2020.

*Primary Examiner* — Eric W Thomas
(74) *Attorney, Agent, or Firm* — Rimon P.C.

(57) ABSTRACT

A electrochemical device negative electrode includes: a negative electrode core material; and a negative electrode material layer supported on the negative electrode core material. The negative electrode material layer contains a carbon material. And a surface layer portion of the negative electrode material layer has a lithium carbonate-containing region.

13 Claims, 4 Drawing Sheets

(51) Int. Cl.
*H01G 11/48* (2013.01)
*H01G 11/50* (2013.01)
*H01G 11/86* (2013.01)
*H01G 11/52* (2013.01)
*H01G 11/62* (2013.01)
*H01M 4/587* (2010.01)
*H01M 10/052* (2010.01)

(52) U.S. Cl.
CPC ............ *H01G 11/86* (2013.01); *H01G 11/52* (2013.01); *H01G 11/62* (2013.01); *H01M 4/587* (2013.01); *H01M 10/052* (2013.01); *H01M 2300/004* (2013.01)

(56) References Cited

U.S. PATENT DOCUMENTS

| | | |
|---|---|---|
| 2014/0178718 A1 | 6/2014 | Kano |
| 2017/0077553 A1 | 3/2017 | Hiraoka et al. |

FOREIGN PATENT DOCUMENTS

| | | | |
|---|---|---|---|
| JP | 2014-146448 | | 8/2014 |
| JP | 2018110076 A | * | 7/2018 |
| WO | 2007/088604 | | 8/2007 |
| WO | 2012/036249 | | 3/2012 |
| WO | 2015/136922 A1 | | 9/2015 |

* cited by examiner

ELECTROCHEMICAL DEVICE NEGATIVE ELECTRODE AND ELECTROCHEMICAL DEVICE, AND METHOD FOR MANUFACTURING ELECTROCHEMICAL DEVICE NEGATIVE ELECTRODE AND METHOD FOR MANUFACTURING ELECTROCHEMICAL DEVICE

TECHNICAL FIELD

The present invention relates to an electrochemical device negative electrode, an electrochemical device, a method for manufacturing an electrochemical device negative electrode, and a method for manufacturing an electrochemical device.

BACKGROUND

Electrochemical devices using a carbon material that absorbs lithium ions for a negative electrode material layer are known (see, Unexamined Japanese Patent Publication No. 2014-123641, International Publication WO 2007/88604, International Publication WO 2012/036249).

An electrochemical device negative electrode according to first aspect of the present invention includes: a negative electrode core material; and a negative electrode material layer supported on the negative electrode core material. The negative electrode material layer contains a carbon material, and a surface layer portion of the negative electrode material layer has a lithium carbonate-containing region. The lithium carbonate-containing region has a thickness ranging from, for example, 1 nm to 100 nm, inclusive.

An electrochemical device according to second aspect of the present invention includes: a positive electrode including a positive electrode core material and a positive electrode material layer supported on the positive electrode core material; the abovementioned negative electrode; a separator disposed between the positive electrode and the negative electrode; and an electrolyte.

A method for manufacturing an electrochemical device negative electrode according to third aspect of the present invention includes: preparing a negative electrode including a negative electrode core material and a negative electrode material layer supported on the negative electrode core material, the negative electrode material layer containing a carbon material; depositing metal lithium onto a surface of the negative electrode material layer; and forming, in the negative electrode material layer, a surface layer portion that includes a lithium carbonate-containing region having a thickness ranging from 1 nm to 100 nm, inclusive, by exposing the negative electrode in a carbon dioxide gas atmosphere, the negative electrode including the negative electrode material layer on which the metal lithium is deposited.

A method for manufacturing an electrochemical device according to fourth aspect of the present invention includes: preparing a negative electrode including a negative electrode core material and a negative electrode material layer supported on the negative electrode core material, the negative electrode material layer containing a carbon material; depositing metal lithium onto a surface of the negative electrode material layer; preparing a positive electrode including a positive electrode core material and a positive electrode material layer supported on the positive electrode core material; forming an electrode body by interposing a separator between the negative electrode and the positive electrode, the negative electrode including the negative electrode material layer on which the metal lithium is deposited; and exposing the electrode body in a carbon dioxide gas atmosphere.

According to the present invention, an increase in internal resistance of an electrochemical device can be effectively suppressed.

DESCRIPTION OF EMBODIMENT

Figure 1:
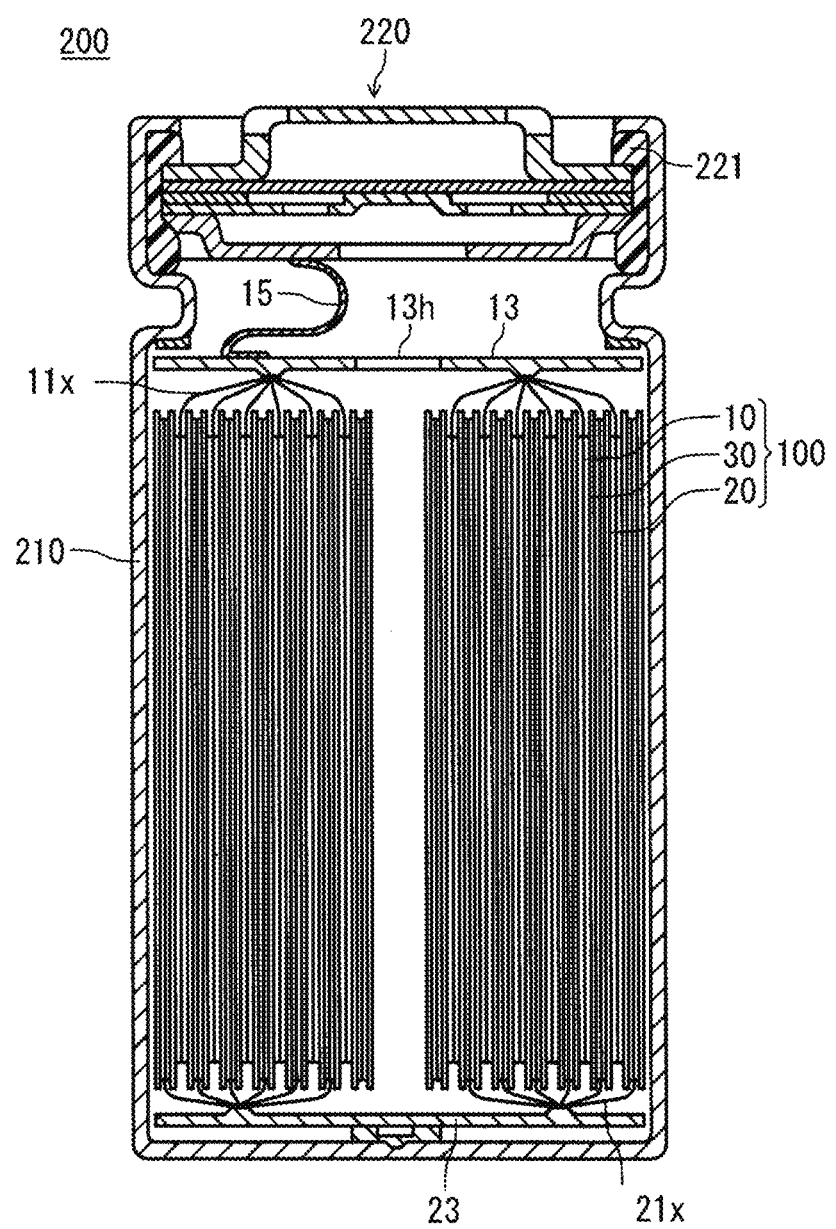
FIG. 1 is a vertical cross-sectional view illustrating a configuration of an electrochemical device according to an exemplary embodiment of the present invention.

In an electrochemical device using lithium ions, a solid electrolyte interface coating film (that is, an SEI coating film) is formed on a negative electrode material layer during charging and discharging. The SEI coating film serves an important function in charging and discharging reaction, but if the SEI coating film is formed excessively thick, the internal resistance of the electrochemical device increases.

An electrochemical device negative electrode according to one exemplary embodiment of the present invention includes: a negative electrode core material; and a negative electrode material layer supported on the negative electrode core material. The negative electrode material layer contains a carbon material. A surface layer portion of the negative electrode material layer includes a coating film formed on the surface of the carbon material. And the coating film contains lithium carbonate. That is, the surface layer portion of the negative electrode material layer has a lithium carbonate-containing region. The lithium carbonate-containing region is, for example, a region of a surface layer portion or a coating film in which substantial presence of lithium carbonate is observed by analysis with X-ray photoelectron spectroscopy (XPS). Note that the analysis method is not limited to the XPS.

Here, the lithium carbonate-containing region is formed as a surface layer portion of the negative electrode material layer before assembly of the electrochemical device. It is considered that, in a case where the lithium carbonate-containing region formed in advance has a sufficient thickness, a homogeneous and moderately thick SEI coating film is formed on the surface of the negative electrode material layer by subsequent charging and discharging in the electrochemical device assembled using the negative electrode having such lithium carbonate-containing region. Thus, an increase in internal resistance of the electrochemical device is reduced. Here, the sufficient thickness may be, for example, 1 nm or more. If a long-term effect is expected, it may be 5 nm or more, and if a more reliable effect is expected, it may be 30 nm or more. However, when the thickness of the lithium carbonate-containing region is more than 100 nm, the internal resistance of the electrochemical device increases because the lithium carbonate-containing region itself becomes a resistance component. Therefore, the thickness of the lithium carbonate-containing region may be 100 nm or less.

The thickness of the lithium carbonate-containing region is measured by analyzing the surface layer portion of the negative electrode material layer at a plurality of locations (at least five locations) of the negative electrode material layer. Then, the average of the thicknesses of the lithium carbonate-containing region measured at the plurality of locations may be used as the thickness of the lithium carbonate-containing region. Note that the negative electrode material layer used as a measurement sample may be peeled off from the negative electrode core material. In this case, the coating film formed on the surface of the carbon material included in the vicinity of the surface layer portion of the negative electrode material layer may be analyzed. In this case, the carbon material covered with the coating film may be collected from the region of the negative electrode material layer formed on the surface opposite to the surface in contact with the negative electrode core material, and the collected carbon material may be analyzed.

The XPS analysis of the surface layer portion of the negative electrode material layer is carried out such that, for example, the surface layer portion or the coating film formed on the surface of the carbon material is irradiated with an argon beam in a chamber of an X-ray photoelectron spectrometer, and a variation in each spectrum assigned to C1s or O1s electrons with respect to the irradiation time is observed and recorded. At this time, from the viewpoint of avoiding analysis error, the spectrum of the outermost surface of the surface layer portion may be ignored. The thickness of a region where the peak assigned to lithium carbonate is stably observed corresponds to the thickness of the lithium carbonate-containing region.

Note that, in the negative electrode that is taken out from the electrochemical device after being charged and discharged at least once, the surface layer portion of the negative electrode material layer or the coating film formed on the surface of the carbon material includes an SEI coating film generated in the electrochemical device. In the SEI coating film, O1s peaks assigned to lithium carbonate may also be observed. However, since the SEI coating film generated in the electrochemical device has a composition different from that of the lithium carbonate-containing region which is formed in advance, it is possible to distinguish them. For example, when the XPS analysis of the SEI coating film is conducted, an F1s peak assigned to the LiF bond is observed, but no substantial F1s peak assigned to the LiF bond is observed in the lithium carbonate-containing region. In addition, the amount of lithium carbonate contained in the SEI coating film is very small. Note that, as the Li1s peak, a peak derived from a compound such as $ROCO_2Li$ or ROLi may be detected, for example.

When the lithium carbonate-containing region is analyzed by the XPS, a second peak assigned to the Li—O bond in an O1s spectrum may be observed in addition to a first peak assigned to the C=O bond in the O1s spectrum. The region of the coating film that is located near the surface of the carbon material is considered to contain a small amount of LiOH or $Li_2O$.

Specifically, when the surface layer portion of the negative electrode material layer is analyzed by the XPS in the depth direction, a first region where the intensity of the first peak is greater than the intensity of the second peak while the first peak and the second peak are observed, and a second region where the intensity of the second peak is greater than the intensity of the first peak while the first peak and the second peak are observed may be present in the order of increasing distance from the outermost surface of the surface layer portion in the depth direction of the surface layer portion. Further, a third region where the first peak is observed and the second peak is not observed may further be present, the third region being located closer to the outermost surface of the surface layer portion than the first region is. The third region is easily observed when the thickness of the lithium carbonate-containing region is large. Note that the magnitude of the peak intensity may be determined by the height of the peak from the baseline.

In the center of the lithium carbonate-containing region in the thickness direction (the the direction), the C1s peak assigned to the C—C bond is usually not observed substantially, or even if it is observed, it is less than half of the intensity of the peak assigned to the C=O bond.

Next, the electrochemical device according to the exemplary embodiment of the present invention includes: a positive electrode including a positive electrode core material and a positive electrode material layer supported on the positive electrode core material; the abovementioned negative electrode; a separator disposed between the positive electrode and the negative electrode; and an electrolyte. The negative electrode and the positive electrode constitute an electrode body together with the separator interposed therebetween. The electrode body is formed as a columnar wound body by winding the positive electrode and the negative electrode, which have a band shape, with the separator therebetween. Further, the electrode body may be formed as a laminated body by laminating the positive electrode and the negative electrode, which have a plate shape, with the separator therebetween.

The positive electrode material layer contains, for example, a conductive polymer as the positive electrode material. As the conductive polymer, polyaniline or a derivative thereof can be used, for example. Among electrochemical devices that use lithium ions, the electrochemical device in which the positive electrode material layer contains a conductive polymer and the negative electrode material layer contains a carbon material is expected to be used in various fields such as for in-vehicle use. In such an electrochemical device, lithium ions in the electrolyte are absorbed in the negative electrode and anions are adsorbed (doped) in the positive electrode during charging. During discharging, lithium ions are released from the negative electrode into the electrolyte, and anions are desorbed (dedoped) from the positive electrode into the electrolyte. Since charging and discharging is performed by doping and dedoping of anions in the conductive polymer, reaction resistance can be small, and thus, high output can be easily achieved.

Since the conductive polymer is an organic substance, it has low heat resistance, and may be dissolved in a highly polar electrolyte solvent. For example, the solvent in the electrolyte may be decomposed by a side reaction to produce alcohol. Conductive polymers such as polyaniline are susceptible to alcohol. Specifically, the non-aqueous electrolytic solution may decompose on the negative electrode, and the decomposed product may react with water content in the non-aqueous electrolytic solution to generate a small amount of alcohol. Polyaniline may be dissolved in alcohol. On the other hand, when a lithium carbonate-containing region having a sufficient thickness is present on the surface layer portion of the negative electrode material layer, the production of alcohol is suppressed.

Anions include, for example, fluorine-containing anions. An electrolyte salt having such anions has a high degree of dissociation, and therefore, a low viscosity electrolytic solution can be obtained. Further, due to the electrolyte including fluorine-containing anions, the withstand voltage characteristics of the electrochemical device can be improved.

Next, the method for manufacturing an electrochemical device negative electrode according to one exemplary embodiment of the present invention includes: a first step of preparing a negative electrode including a negative electrode core material and a negative electrode material layer supported on the negative electrode core material, the negative electrode material layer containing a carbon material; a second step of depositing metal lithium onto the surface of the negative electrode material layer; and a third step of forming, in the negative electrode material layer, a surface layer portion that includes a lithium carbonate-containing region having a thickness ranging from 1 nm to 100 nm, inclusive, by exposing the negative electrode in a carbon dioxide gas atmosphere. The negative electrode includes the negative electrode material layer on which the metal lithium is deposited. In this method, the lithium carbonate-containing region in the surface layer portion of the negative electrode material layer is formed through the second step and the third step. These steps serve as at least a part of a step of pre-doping lithium ions into the negative electrode material layer.

The second step for depositing metal lithium to the surface of the negative electrode material layer can be performed by, for example, a vapor phase method, transfer, or the like. Examples of the vapor phase method include chemical vapor deposition, physical vapor deposition, and sputtering. For example, metal lithium may be formed into a film on the surface of the negative electrode material layer by a vacuum vapor deposition apparatus. The pressure in a chamber of the apparatus during vapor deposition may be, for example, $10^{-2}$ Pa to $10^{-5}$ Pa, the temperature of a lithium evaporation source may be 400° C. to 600° C., and the temperature of the negative electrode material layer may be −20° C. to 80° C.

The carbon dioxide gas atmosphere is preferably a dry atmosphere that does not contain water, and may have, for example, a dew point of −40° C. or lower or −50° C. or lower. The carbon dioxide gas atmosphere may contain gases other than carbon dioxide, but the molar fraction of carbon dioxide is preferably 80% or more, more preferably 95% or more. It is preferable that the carbon dioxide gas atmosphere does not contain an oxidizing gas, and the molar fraction of oxygen may be 0.1% or less.

In order to increase the thickness of the lithium carbonate-containing region, it is efficient that the partial pressure of carbon dioxide is set more than, for example, 0.5 atm ($5.05 \times 10^4$ Pa), and it may be set to 1 atm ($1.01 \times 10^5$ Pa) or more.

The temperature of the negative electrode exposed to the carbon dioxide gas atmosphere may be, for example, in the range from 15° C. to 120° C., inclusive. The higher the temperature, the thicker the lithium carbonate-containing region.

The thickness of the lithium carbonate-containing region can be easily controlled by varying the time for exposing the negative electrode to the carbon dioxide gas atmosphere. The exposure time may be, for example, 12 hours or more, and less than 10 days.

It is preferable that the third step is performed before the electrode body is constructed. Alternatively, the third step may be performed after the electrode body is constructed. That is, the third step may include: preparing a positive electrode including a positive electrode core material and a positive electrode material layer supported on the positive electrode core material; forming an electrode body by interposing a separator between the negative electrode and the positive electrode, the negative electrode including the negative electrode material layer on which metal lithium is deposited; and forming, in the negative electrode material layer, a surface layer portion that includes a lithium carbonate-containing region having a thickness from 1 nm to 100 nm, inclusive, by exposing the electrode body to a carbon dioxide gas atmosphere.

The pre-doping of lithium ions into the negative electrode material layer proceeds further by, for example, bringing the negative electrode material layer into contact with the electrolyte, and is completed after they are left for a predetermined time.

The electrochemical device according to the present invention includes an electrochemical device such as a lithium ion secondary battery, a lithium ion capacitor, and an electric double layer capacitor, and in particular, it is suitable as an electrochemical device intermediate between a lithium ion secondary battery using a conductive polymer for a positive electrode material and a lithium ion capacitor.

FIG. 1 schematically shows a configuration of electrochemical device 200 according to an exemplary embodiment of the present invention. Electrochemical device 200 is provided with: wound body 100; a non-aqueous electrolyte (not shown); metallic bottomed cell case 210 housing electrode body 100 and the non-aqueous electrolyte; and sealing plate 220 that seals an opening of cell case 210. Gasket 221 is provided on the peripheral edge of sealing plate 220, and cell case 210 is sealed by crimping the open end of cell case 210 to gasket 221. Positive electrode current collector plate 13 having through hole 13h in the center is welded to exposed section 11x of positive electrode core material. One end of tab lead 15 is connected to positive electrode current collector plate 13, and the other end of tab lead 15 is connected to an inner surface of sealing plate 220. Thus, sealing plate 220 has a function as an external positive electrode terminal. Meanwhile, negative electrode current collector plate 23 is welded to exposed section 21x of negative electrode core material. Negative electrode current collector plate 23 is directly welded to a welding member provided on the inner bottom surface of cell case 210. Thus, cell case 210 has a function as an external negative electrode terminal.

Each component of the electrochemical device according to the exemplary embodiment of the present invention will be described in more detail below by taking, as an example, an electrochemical device in which a conductive polymer is used as a positive electrode material and a carbon material is used as a negative electrode material.

(Positive Electrode Core Material)

A sheet-shaped metal material is used as the positive electrode core material. As the sheet-shaped metal material, a metal foil, a porous metal body, an etched metal, or the like can be used. As the metal material, aluminum, aluminum alloy, nickel, titanium, and the like can be used. The thickness of the positive electrode core material ranges, for example, from 10 μm to 100 μm, inclusive. A carbon layer may be formed on the positive electrode core material. The carbon layer is interposed between the positive electrode core material and the positive electrode material layer. Thus, the carbon layer has, for example, a function of improving the current collecting property from the positive electrode material layer to the positive electrode core material.

(Carbon Layer)

The carbon layer is formed, for example, by depositing a conductive carbon material on the surface of the positive electrode core material, or forming a coating film of a carbon paste containing a conductive carbon material, and drying the coating film. The carbon paste includes, for example, a conductive carbon material, a polymer material, and water or an organic solvent. The thickness of the carbon layer may ranges, for example, from 1 μm to 20 μm, inclusive. As the conductive carbon material, graphite, hard carbon, soft carbon, carbon black, or the like can be used. Among them, carbon black can form a thin carbon layer having excellent conductivity. As the polymer material, fluororesin, acrylic resin, polyvinyl chloride, styrene-butadiene rubber (SBR), etc. can be used.

(Positive Electrode Material Layer)

The positive electrode material layer contains a conductive polymer. The positive electrode material layer is formed, for example, by immersing a positive electrode core material provided with a carbon layer in a reaction solution containing a raw material monomer of a conductive polymer, and electrolytically polymerizing the raw material monomer in the presence of the positive electrode core material. During this process, electrolytic polymerization with the positive electrode core material as an anode is performed, whereby the positive electrode material layer containing the conductive polymer is formed so as to cover the carbon layer. The thickness of the positive electrode material layer can be controlled by the electrolytic current density, the polymerization time, and the like. The thickness of the positive electrode material layer ranges, for example, from 10 μm to 300 μm, inclusive, per each surface.

As the conductive polymer, a π-conjugated polymer is preferable. As the π-conjugated polymer, for example, polypyrrole, polythiophene, polyfuran, polyaniline, polythiophene vinylene, polypyridine, or derivatives thereof can be used. These materials may be used alone or in combination of two or more. The weight average molecular weight of the conductive polymer ranges, for example, from 1000 to 100000, inclusive. The derivative of the x-conjugated polymer means a polymer having, as a basic skeleton, a x-conjugated polymer such as polypyrrole, polythiophene, polyfuran, polyaniline, polythiophene vinylene, or polypyridine. For example, polythiophene derivatives include poly (3,4-ethylenedioxythiophene) (PEDOT), and the like.

The positive electrode material layer may be formed by a method other than electrolytic polymerization. For example, the positive electrode material layer containing a conductive polymer may be formed by chemical polymerization of a raw material monomer. Alternatively, the positive electrode material layer may be formed by using a conductive polymer synthesized in advance or a dispersion including the conductive polymer.

The raw material monomer used in electrolytic polymerization or chemical polymerization may be any polymerizable compound capable of producing a conductive polymer by polymerization. The raw material monomer may contain an oligomer. As the raw material monomer, aniline, pyrrole, thiophene, furan, thiophene vinylene, pyridine, or derivatives thereof are used, for example. These materials may be used alone or in combination of two or more. Among them, aniline is likely to grow on the surface of the carbon layer by electrolytic polymerization.

Electrolytic polymerization or chemical polymerization can be carried out using a reaction solution containing an anion (dopant). Excellent conductivity is exhibited by doping the T-electron conjugated polymer with a dopant. For example, in chemical polymerization, the positive electrode core material may be immersed in a reaction solution containing a dopant, an oxidizing agent, and a raw material monomer, and then, taken out from the reaction solution and dried. In electrolytic polymerization, the positive electrode core material and a counter electrode may be immersed in a reaction solution containing a dopant and a raw material monomer. Then, a voltage may be applied between the positive electrode core material and a counter electrode with the positive electrode core material as an anode to flow a current between them.

Examples of the dopant include sulfate ion, nitrate ion, phosphate ion, borate ion, benzenesulfonate ion, naphthalene sulfonate ion, toluene sulfonate ion, methanesulfonate ion ($CF_3SO_3^-$), perchlorate ion ($ClO_4^-$), tetrafluoroborate ion ($BF_4^-$), hexafluorophosphate ion ($PF_6^-$), fluorosulfate ion ($FSO_3^-$), bis(fluorosulfonyl)imide ion ($N(FSO_2)_2^-$), and bis(trifluoromethanesulfonyl)imide ion ($N(CF_3SO_2)_2^-$). These materials may be used alone or in combination of two or more.

The dopant may be a polymer ion. Examples of the polymer ions include ions of polyvinyl sulfonic acid, polystyrene sulfonic acid, polyallyl sulfonic acid, polyacrylic sulfonic acid, polymethacrylic sulfonic acid, poly(2-acrylamide-2-methylpropane sulfonic acid), polyisoprene sulfonic acid, and polyacrylic. These materials may be homopolymers or copolymers of two or more kinds of monomers. These materials may be used alone or in combination of two or more.

(Positive Electrode Current Collector Plate)

The positive electrode current collector plate is a metal plate having a substantially disk shape. It is preferable to form a through hole serving as a passage for the non-aqueous electrolyte in the central portion of the positive electrode current collector plate. The material of the positive electrode current collector plate is, for example, aluminum, aluminum alloy, titanium, stainless steel, or the like. The material of the positive electrode current collector plate may be the same as the material of the positive electrode core material.

(Negative Electrode Core Material)

A sheet-shaped metal material is also used for the negative electrode core material. As the sheet-shaped metal material, a metal foil, a porous metal body, an etched metal, or the like can be used. As the metal material, copper, copper alloy, nickel, stainless steel, and the like can be used. The thickness of the negative electrode core material is smaller than the thickness of the positive electrode core material, and ranges, for example, from 10 μm to 100 μm, inclusive.

(Negative Electrode Material Layer)

The negative electrode material layer includes a carbon material that electrochemically absorbs and releases lithium ions as a negative electrode active material. As the carbon material, graphite, non-graphitizing carbon (hard carbon), and graphitizing carbon (soft carbon) are preferable, and graphite and hard carbon are particularly preferable. A carbon material and other materials may be used in combination.

The negative electrode material layer may contain a conductive agent, a binder, and the like in addition to the negative electrode active material. Examples of the conductive agent include carbon black and carbon fiber. Examples of the binder include fluororesin, acrylic resin, rubber material, and cellulose derivative.

The negative electrode material layer is formed, for example, in such a way that a negative electrode mixture paste is prepared by mixing a negative electrode active material with a conductive agent, a binder, and the like together with a dispersion medium, and the negative electrode mixture paste is applied to the negative electrode current collector plate and dried. The thickness of the negative electrode material layer ranges, for example, from 10 µm to 300 µm, inclusive, per each surface.

The negative electrode material layer is pre-doped with lithium ions. As a result, the potential of the negative electrode is lowered, so that the potential difference (that is, voltage) between the positive electrode and the negative electrode is increased, and the energy density of the electrochemical device is improved. As described above, the pre-doping of lithium ions into the negative electrode material layer proceeds by applying metal lithium to the surface of the negative electrode material layer in the form of a film and then immersing the negative electrode in the non-aqueous electrolyte. Lithium ions elute from metal lithium into the non-aqueous electrolyte and are absorbed in the negative electrode material layer. The amount of lithium to be pre-doped may be, for example, about 50% to 95% of the maximum amount that can be absorbed in the negative electrode material layer.

(Negative Electrode Current Collector Plate)

The negative electrode current collector plate is a metal plate having a substantially disk shape. The material of the negative electrode current collector plate is, for example, copper, copper alloy, nickel, stainless steel, or the like. The material of the negative electrode current collector plate may be the same as the material of the negative electrode core material.

(Separator)

As the separator, a non-woven fabric made of cellulose fiber, a non-woven fabric made of glass fiber, a microporous film made of polyolefin, a woven fabric, a non-woven fabric, or the like can be used. The thickness of the separator ranges, for example, from 10 µm to 300 µm, inclusive, preferably from 10 µm to 40 µm, inclusive.

(Electrolyte)

The electrolyte has lithium ion conductivity and contains a lithium salt and a solvent that dissolves the lithium salt. The lithium salt anion is repeatedly reversibly doped into and dedoped from the positive electrode. Lithium ions derived from the lithium salt are reversibly absorbed in and released from the negative electrode.

Examples of lithium salts include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. These materials may be used alone or in combination of two or more. Among them, a salt having a fluorine-containing anion is preferable. The concentration of lithium salt in the non-aqueous electrolyte in the charged state (charging rate (SOC) of 90% to 100%) ranges, for example, from 0.2 mol/L to 5 mol/L, inclusive.

Examples of usable solvents include: cyclic carbonates such as ethylene carbonate, propylene carbonate, and butylene carbonate; chain carbonates such as dimethyl carbonate, diethyl carbonate, and ethyl methyl carbonate; aliphatic carboxylic acid esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran, 2-methyltetrahydrofuran; dimethylsulfoxide; 1,3-dioxolane; formamide; acetamide; dimethylformamide; dioxolane; acetonitrile; propionitrile; nitromethane; ethylmonoglyme; trimethoxymethane; sulfolane; methylsulfolane; and 1,3-propane sultone. These materials may be used alone or in combination of two or more.

The electrolyte may contain various additives as needed. For example, unsaturated carbonates such as vinylene carbonate, vinylethylene carbonate, and divinylethylene carbonate may be added as an additive for forming a lithium ion conductive coating film on the surface of the negative electrode.

EXAMPLES

Hereinafter, the present invention will be described in more detail based on Examples, but the present invention is not limited to Examples.

Example 1

(1) Fabrication of Positive Electrode

A carbon layer (with a thickness of 2 µm) containing carbon black was formed on both surfaces of an aluminum foil (positive electrode core material) having a thickness of 25 µm. Meanwhile, an aniline aqueous solution containing aniline and sulfuric acid was prepared. The positive electrode core material and a counter electrode were immersed in the aqueous aniline solution, and were electrolytically polymerized for 20 minutes with a current density of 10 mA/cm² to allow a conductive polymer (polyaniline) film doped with sulfate ion ($SO_4^{2-}$) to grow on the carbon layer as a positive electrode material layer. During this process, an exposed section of the positive electrode core material, which has a width of 10 mm, was formed at the end of the positive electrode core material along the longitudinal direction. Next, the conductive polymer doped with sulfate ion was reduced to dedope the doped sulfate ion. Then, the positive electrode material layer was thoroughly washed and dried. The thickness of the positive electrode material layer was 50 µm per each surface.

(2) Fabrication of Negative Electrode

A copper foil (negative electrode core material) with a thickness of 10 µm was prepared. Meanwhile, a negative electrode mixture paste was prepared. The negative electrode mixture paste was obtained by kneading a mixed powder including 97 parts by mass of hard carbon, 1 part by mass of carboxycellulose, and 2 parts by mass of styrene-butadiene rubber with water at a mass ratio of 40:60 (mixed powder:water) was prepared. The negative electrode mixture paste was applied to both surfaces of the negative electrode core material and dried to form a negative electrode material layer having a thickness of 50 µm. An exposed section of a negative electrode core material, which has a width of 10 mm, was formed at the end of the negative electrode core material along the longitudinal direction.

Next, a thin film of metal lithium was formed on the entire surface of the negative electrode material layer by vacuum deposition. The amount of lithium to be pre-doped was set such that the negative electrode potential in the non-aqueous electrolyte after the completion of pre-doping was 0.2 V or less with respect to metal lithium.

Then, a chamber of an apparatus was purged with carbon dioxide to create a carbon dioxide gas atmosphere. The dew point of the carbon dioxide gas atmosphere was −40° C., the molar fraction of carbon dioxide was 100%, and the pressure inside the chamber was 1 atm ($1.01 \times 10^5$ Pa). The temperature of the negative electrode exposed to the carbon dioxide gas atmosphere of 1 atm was set to 25° C. The time for exposing the negative electrode to the carbon dioxide gas atmosphere was varied as shown in Table 1, and negative electrodes A1 to A4 of Examples and negative electrodes B1 to B3 of Comparative Examples were obtained. Regarding the electrochemical device B3 of Comparative Example 3, the chamber of the apparatus was not purged with carbon dioxide.

(3) Fabrication of Electrode Body

The positive electrode and the negative electrode were wound in a columnar shape with a cellulose non-woven fabric separator (with a thickness 35 μm) therebetween to form an electrode body. During this process, the exposed section of positive electrode core material was projected from one end face of the wound body, and the exposed section of negative electrode core material was projected from the other end face of the electrode body. A positive electrode current collector plate and a negative electrode current collector plate, both of which had a disk shape, were welded to the exposed section of positive electrode core material and the exposed section of negative electrode core material, respectively.

(4) Preparation of Non-Aqueous Electrolytic Solution

A solvent was prepared by adding 0.2% by mass of vinylene carbonate to a mixture of propylene carbonate and dimethyl carbonate in a volume ratio of 1:1. $LiPF_6$ was dissolved as a lithium salt in the obtained solvent at a predetermined concentration to prepare a non-aqueous electrolyte having hexafluorophosphate ion ($PF_6^-$) as an anion.

(5) Evaluation 1

The surface layer portion of the negative electrode material layer was analyzed by the XPS to measure the thickness of the lithium carbonate-containing region. An X-ray photoelectron spectrometer (product name: Model 5600, manufactured by ULVAC-PHI, Inc.) was used for the XPS analysis. The measurement conditions were as follows.

Figure 2:
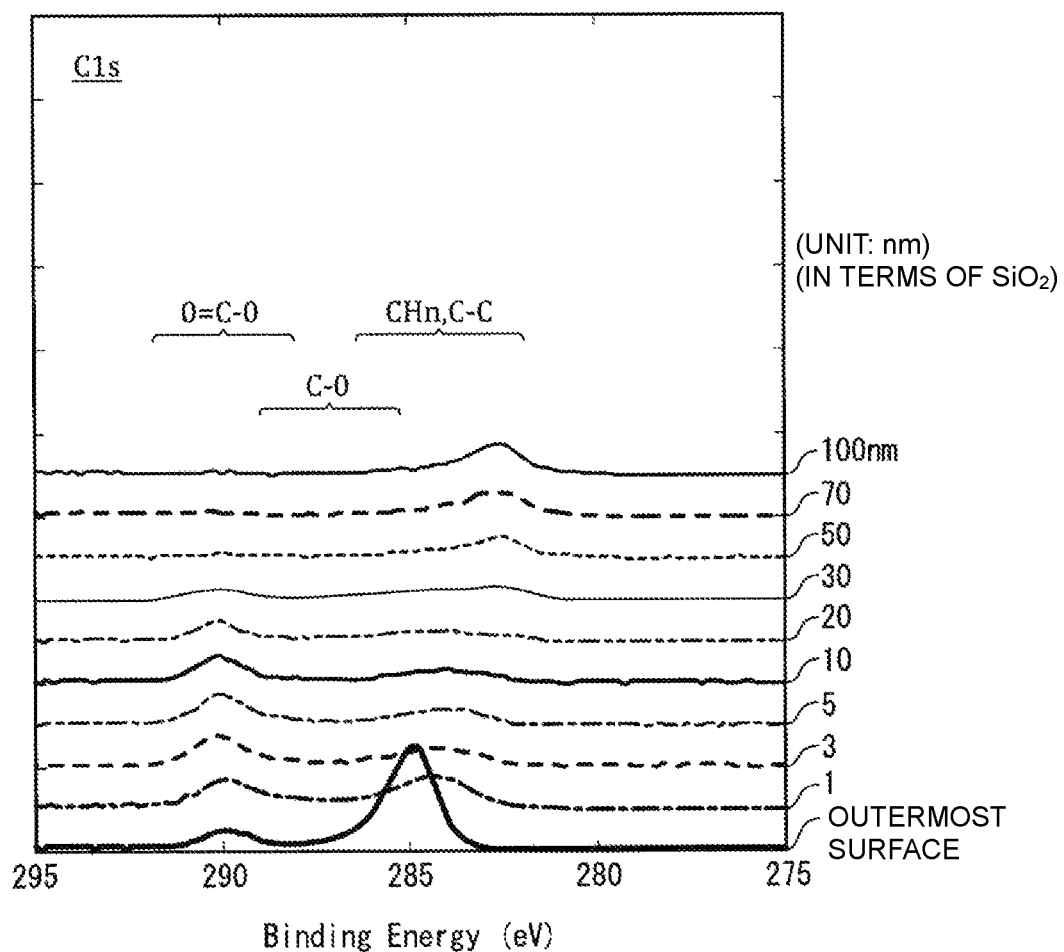
FIG. 2 is a diagram showing a C1s spectrum by XPS analysis of a lithium carbonate-containing region having a thickness of 30 nm.
Figure 3:
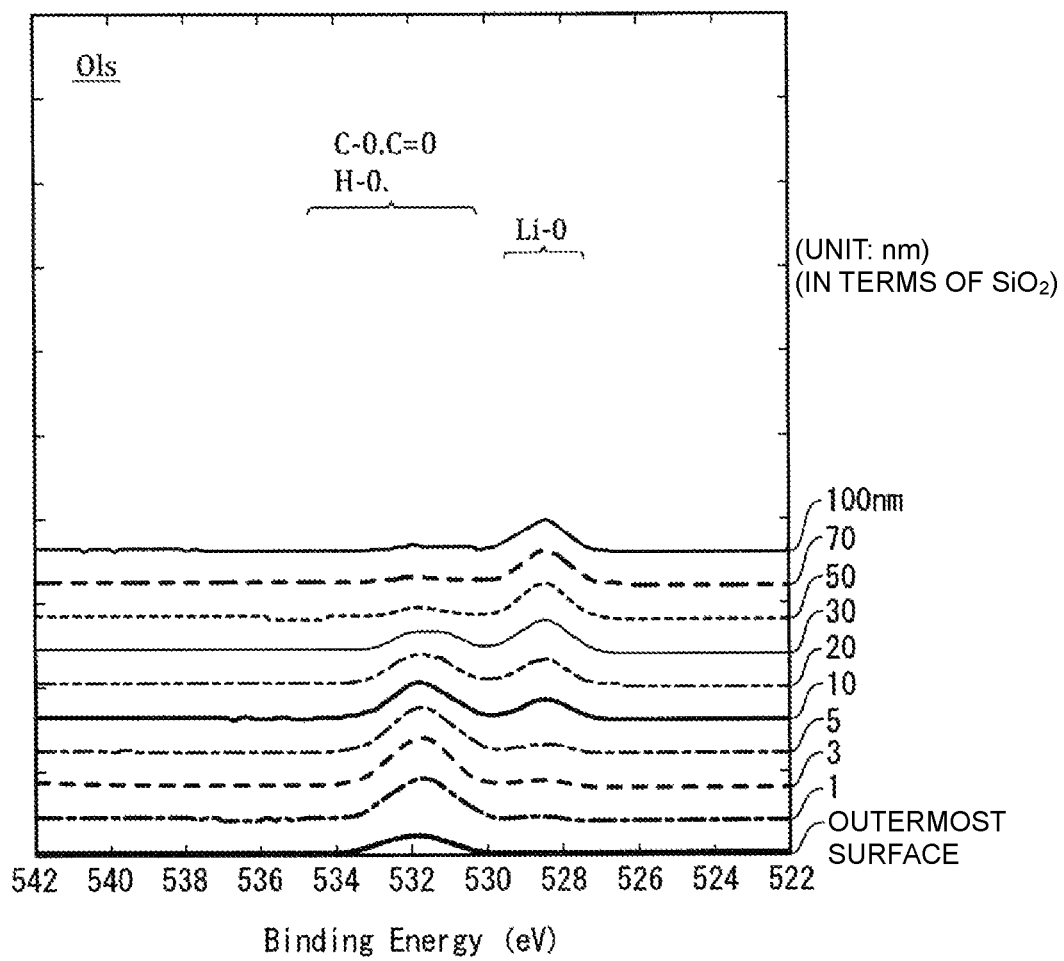
FIG. 3 is a diagram showing an O1s spectrum by XPS analysis of a lithium carbonate-containing region having a thickness of 30 nm.
Figure 4:
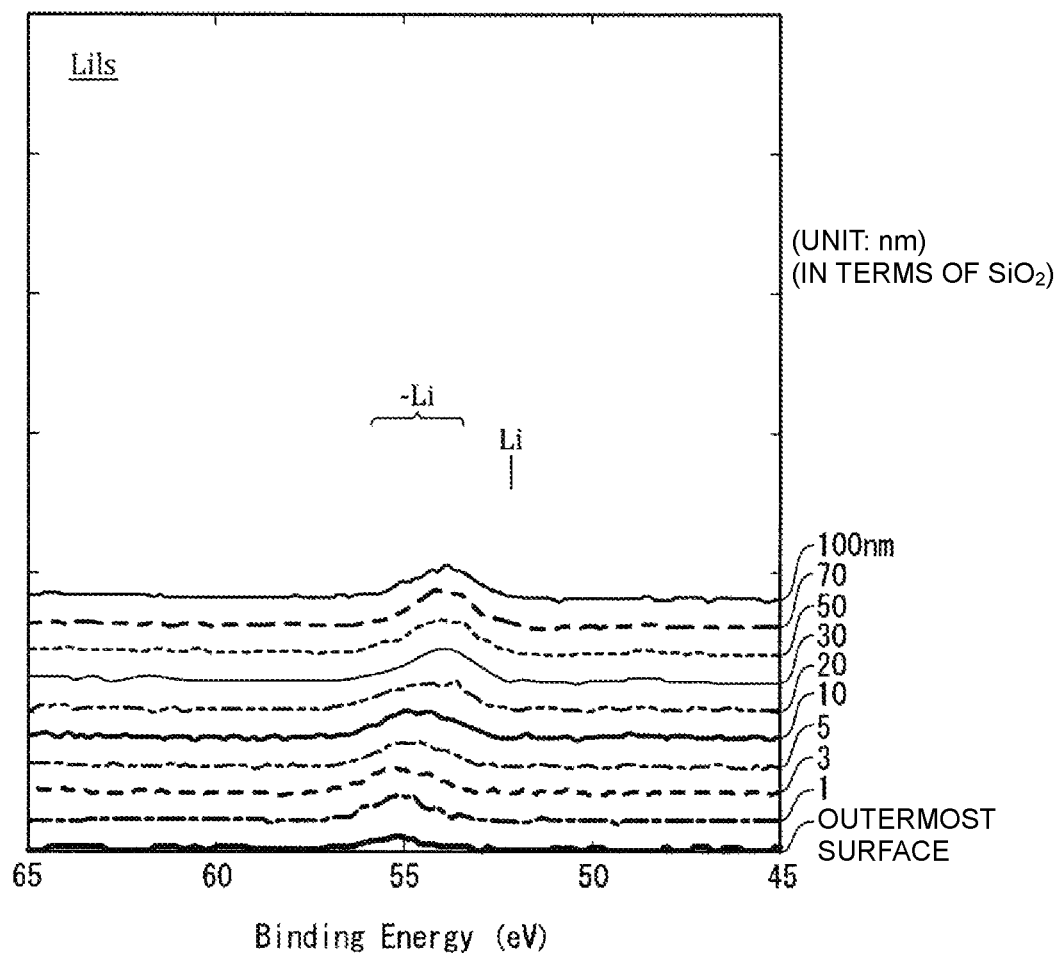
FIG. 4 is a diagram showing a Li1s spectrum by XPS analysis of a lithium carbonate-containing region having a thickness of 30 nm.

X-ray source: Al-mono (1486.6 eV) 14 kV/200 W
Measurement diameter: 800 μmφ
Photoelectron extraction angle: 45°
Etching condition: 3 kV of acceleration voltage, approximately 3.1 nm/min (in terms of $SiO_2$) of etching rate, 3.1 mm×3.4 mm of raster area FIG. 2 is a diagram showing a C1s spectrum obtained by the XPS analysis of the surface layer portion of the negative electrode material layer of the negative electrode A3 of Example 3. FIG. 3 is a diagram showing an O1s spectrum obtained by the XPS analysis of the surface layer portion of the negative electrode material layer of the negative electrode A3 of Example 3. FIG. 4 is a diagram showing a Li1s spectrum obtained by the XPS analysis of the surface layer portion of the negative electrode material layer of the negative electrode A3 of Example 3.

According to FIG. 2, a peak of C—C bond or the like which is presumed to be impurity carbon can be seen on the outermost surface of the surface layer portion, but it sharply decreases near the depth of 1 nm to 3 nm in the surface layer portion, and nearly disappears at a depth of 10 nm to 20 nm. The peak of C—C bond or the like seen in the deep part is presumed to be derived from hard carbon of the active material. On the other hand, a peak assigned to the C=O bond is constantly observed from the outermost surface of the surface layer portion to a depth of 30 nm.

According to FIG. 3, a first peak assigned to the C=O bond can be seen from the outermost surface of the surface layer portion to a depth of 30 nm. A second peak assigned to the Li—O bond is observed from a depth of around 5 nm. In addition, in the order of increasing distance from the outermost surface of the surface layer portion in the depth direction, there are a third region in which the first peak is observed and the second peak is not observed, a first region in which the intensity of the first peak is larger than the intensity of the second peak while the first peak and the second peak are observed, and a second region in which the intensity of the second peak is larger than the intensity of the first peak while the first peak and the second peak are observed.

In FIG. 4, the presence of Li can be constantly confirmed from the outermost surface of the surface layer portion to a depth of 100 nm. Note that no peak assigned to LiF was observed.

(6) Assembly of Electrochemical Device

The wound body was housed in a bottomed cell case with an opening, the tab lead connected to the positive electrode current collector plate was connected to the inner surface of the sealing plate, and the negative electrode current collector plate was welded to the inner bottom surface of the cell case. A non-aqueous electrolyte was injected into the cell case, and then, the opening of the cell case was closed with the sealing plate. Thus, the electrochemical device as shown in FIG. 1 was assembled. Then, aging was performed at 25° C. for 24 hours, while applying a charging voltage of 3.8 V between the terminals of the positive electrode and the negative electrode, to thereby complete the pre-doping of lithium ions to the negative electrode.

Immediately after aging, the electrochemical device was charged with a voltage of 3.8 V, and then the capacitance was measured. In addition, the electrochemical device was discharged from a voltage of 3.8 V for a predetermined time, and the internal resistance (initial DCR: Direct Current Resistance) was obtained from the amount of voltage drop at that time. The results are shown in Table 1.

TABLE 1

| | Thickness of lithium carbonate-containing region (nm) | DCR (%) | Capacitance (%) | Exposure time in carbon dioxide gas atmosphere (h) |
| --- | --- | --- | --- | --- |
| B1 | 0.5 | 97 | 146 | 1 |
| A1 | 1.0 | 48 | 196 | 24 |
| A2 | 5.0 | 49 | 193 | 48 |
| A3 | 30 | 47 | 196 | 144 |
| A4 | 100 | 49 | 194 | 168 |
| B2 | 110 | 95 | 170 | 300 |
| B3 | 0 | 100 | 100 | 0 |

The values of DCR and capacitance in Table 1 are relative values with respect to the value in Comparative Example 3, which is defined as 100. It can be understood that the DCR is greatly reduced and the capacitance is improved by setting the thickness of the lithium carbonate-containing region to 1 nm or more. Meanwhile, when the thickness of the lithium carbonate-containing region is more than 100 nm, the effect of reducing DCR is remarkably reduced. Further, it can be seen that it is necessary to expose the negative electrode material layer to the carbon dioxide gas atmosphere over a considerable period of time in order to form a lithium carbonate-containing region having a sufficient thickness.

The electrochemical device according to the present invention is suitable for in-vehicle use, for example.

The invention claimed is:

1. An electrochemical device comprising:
a positive electrode including a positive electrode core material and a positive electrode material layer supported on the positive electrode core material;
a negative electrode including a negative electrode core material and a negative electrode material layer supported on the negative electrode core material;

a separator disposed between the positive electrode and the negative electrode; and an electrolyte, wherein:

the negative electrode material layer contains a carbon material, a surface layer portion of the negative electrode material layer has a lithium carbonate-containing region, and the lithium carbonate-containing region has a thickness ranging from 1 nm to 100 nm, inclusive.

2. The electrochemical device according to claim 1, wherein:

an O1s spectrum measured by X-ray photoelectron spectroscopy of the lithium carbonate-containing region has a first peak assigned to a C=O bond and a second peak assigned to a L—O bond, and a first region where an intensity of the first peak is greater than an intensity of the second peak while the first peak and the second peak are observed, and a second region where the intensity of the second peak is greater than the intensity of the first peak while the first peak and the second peak are observed are present in an order of increasing distance from an outermost surface of the surface layer portion in a depth direction of the surface layer portion.

3. The electrochemical device according to claim 2, further comprising a third region where the first peak is observed and the second peak is not observed, the third region being located closer to the outermost surface of the surface layer portion than the first region is.

4. The electrochemical device according to claim 1, wherein in a F1s spectrum measured by X-ray photoelectron spectroscopy of the lithium carbonate-containing region, no substantial peak assigned to a LiF bond is observed.

5. The electrochemical device according to claim 1, wherein the positive electrode material layer contains a conductive polymer.

6. The electrochemical device according to claim 1, wherein the electrolyte contains a fluorine-containing anion.

7. An electrochemical device negative electrode comprising:

a negative electrode core material; and a negative electrode material layer supported on the negative electrode core material, wherein:

the negative electrode material layer contains a carbon material, a surface layer portion of the negative electrode material layer has a lithium carbonate-containing region, an O1s spectrum measured by X-ray photoelectron spectroscopy of the lithium carbonate-containing region has a first peak assigned to a C—O bond and a second peak assigned to a Li—O bond, and a first region where an intensity of the first peak is greater than an intensity of the second peak while the first peak and the second peak are observed, and a second region where the intensity of the second peak is greater than the intensity of the first peak while the first peak and the second peak are observed are present in an order of increasing distance from an outermost surface of the surface layer portion in a depth direction of the surface layer portion.

8. The electrochemical device negative electrode according to claim 7, wherein the lithium carbonate-containing region has a thickness ranging from 1 nm to 100 nm, inclusive.

9. The electrochemical device negative electrode according to claim 7, further comprising a third region where the first peak is observed and the second peak is not observed, the third region being located closer to the outermost surface of the surface layer portion than the first region is.

10. The electrochemical device negative electrode according to claim 7, wherein in a F1s spectrum measured by X-ray photoelectron spectroscopy of the lithium carbonate-containing region, no substantial peak assigned to a LiF bond is observed.

11. An electrochemical device comprising:

a positive electrode including a positive electrode core material and a positive electrode material layer supported on the positive electrode core material;

the negative electrode according to claim 7;

a separator disposed between the positive electrode and the negative electrode; and an electrolyte.

12. The electrochemical device according to claim 11, wherein the positive electrode material layer contains a conductive polymer.

13. The electrochemical device according to claim 11, wherein the electrolyte contains a fluorine-containing anion.

* * * * *